(12) United States Patent
Li et al.

(10) Patent No.: US 10,411,820 B2
(45) Date of Patent: Sep. 10, 2019

(54) METHODS, USER EQUIPMENT AND RADIO NETWORK NODE FOR INTERFERENCE MITIGATION IN A DYNAMIC TIME DIVISION DUPLEX SYSTEM

(71) Applicants: Telefonaktiebolaget L M Ericsson (publ), Stockholm (SE); Shaohua Li, Beijing (CN)

(72) Inventors: Shaohua Li, Beijing (CN); Rui Fan, Beijing (CN); Zhiheng Guo, Beijing (CN); Jinhua Liu, Beijing (CN); Xinghua Song, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 187 days.

(21) Appl. No.: 14/911,070

(22) PCT Filed: Aug. 15, 2013

(86) PCT No.: PCT/CN2013/081513
§ 371 (c)(1),
(2) Date: Feb. 9, 2016

(87) PCT Pub. No.: WO2015/021628
PCT Pub. Date: Feb. 19, 2015

(65) Prior Publication Data
US 2016/0197690 A1 Jul. 7, 2016

(51) Int. Cl.
*H04J 3/10* (2006.01)
*H04L 25/02* (2006.01)
(Continued)

(52) U.S. Cl.
CPC .............. *H04J 3/10* (2013.01); *H04B 1/48* (2013.01); *H04J 11/0056* (2013.01);
(Continued)

(58) Field of Classification Search
CPC ...... H04J 3/10; H04J 11/0056; H04J 11/0054; H04W 72/082
See application file for complete search history.

(56) References Cited

U.S. PATENT DOCUMENTS

2008/0064432 A1   3/2008  Park et al.
2010/0309861 A1* 12/2010  Gorokhov ............ H04B 1/7103
                                                      370/329
(Continued)

FOREIGN PATENT DOCUMENTS

CN          103220677 A       7/2013

OTHER PUBLICATIONS

3GPP TSG RAN WG1 Meeting #73; Fukuoka, Japan; Title; RAN1 Chairman's Notes, May 20-24, 2013.
(Continued)

*Primary Examiner* — Alex Skripnikov
*Assistant Examiner* — Pamit Kaur
(74) *Attorney, Agent, or Firm* — Sage Patent Group

(57) ABSTRACT

The present disclosure relates to methods, a user equipment and a radio network node for interference mitigation in a dynamic TDD system comprising a user equipment (201, 700), a serving base station (202) serving the user equipment (201, 700), at least one neighboring base station (203) and at least one neighboring user equipment (204) served by the at least neighboring base station (203). The method comprises obtaining (S301) link direction information and at least one transmission parameter, wherein the link direction information and the at least one transmission parameter are associated with downlink transmission of the at least one neighboring base station (203) or uplink transmission of the at least one neighboring user equipment (204). The method further comprises mitigating (S302) interference caused by the downlink transmission or uplink transmission based
(Continued)

upon the link direction information and the at least one transmission parameter. The methods, user equipment and radio network node of the present disclosure may overcome or alleviate the interference issues in the dynamic TDD system and give quality and efficiency of the wireless communication a big boost.

24 Claims, 5 Drawing Sheets

(51) Int. Cl.
  *H04B 1/48*   (2006.01)
  *H04W 72/08*   (2009.01)
  *H04J 11/00*   (2006.01)

(52) U.S. Cl.
  CPC ...... *H04J 11/0059* (2013.01); *H04L 25/0224* (2013.01); *H04W 72/082* (2013.01); *H04B 2001/485* (2013.01)

(56) References Cited

U.S. PATENT DOCUMENTS

| | | | | |
|---|---|---|---|---|
| 2013/0194982 A1* | 8/2013 | Fwu | ............... | H04W 72/0493 370/280 |
| 2014/0003270 A1* | 1/2014 | Maltsev | ............ | H04W 76/27 370/252 |
| 2016/0014791 A1* | 1/2016 | Liu | .................. | H04W 72/082 370/252 |
| 2016/0066288 A1* | 3/2016 | Feng | ................. | H04W 52/54 370/280 |

OTHER PUBLICATIONS (Draft) 3GPP TS 36.213 v11.2.0; Technical Specification; 3rd Generation Partnership Project; Technical Specification Group Radio Access Network; Evolved Universal Terrestrial Radio Access (E-UTRA); Physical layer procedures (Release 11) 2013.

3GPP TSG-RAN WG1 #72; St. Julian's, Malta; Source: Ericsson, ST-Ericsson; Title: Signalling support for dynamic TDD (RI-130558), Jan. 28-Feb. 1, 2013.

PCT International Search Report for International application No. PCT/CN2013/081513, dated May 28, 2014.

3GPP TSG RAN WG1 Meeting #74; Barcelona, Spain; Source: NTT DOCOMO; Title: Discussion on Backhaul Signaling for eIMTA (R1-133450)—Aug. 19-23, 2013.

3GPP TSG RAN WG1 Meeting #73; Fukuoka, Japan; Source: CATT; Title: UE Measurements for TDD eIMTA (R1-131884)—May 20-24, 2013.

3GPP TSG RAN WG1 Meeting #73; Fukuoka, Japan; Source: New Postcom; Title: Considerations on Issues of Interference Mitigation Schemes (R1-132199)—May 20-24, 2013.

3GPP TSG RAN WG1 Meeting #72bis; Chicago, USA; Source: Research in Motion, UK Limited; Title: Interference Mitigation in TDD eIMTA (R1-131352)—Apr. 15-19, 2013.

Extended European Search Report for Application No. EP 13 89 1474—dated Mar. 1, 2017.

* cited by examiner

METHODS, USER EQUIPMENT AND RADIO NETWORK NODE FOR INTERFERENCE MITIGATION IN A DYNAMIC TIME DIVISION DUPLEX SYSTEM

PRIORITY

This nonprovisional application is a U.S. National Stage Filing under 35 U.S.C. § 371 of International Patent Application Serial No. PCT/CN2013/081513, filed Aug. 15, 2013, and entitled "Methods, User Equipment And Radio Network Node For Interference Mitigation In A Dynamic Time Division Duplex System".

TECHNICAL FIELD

The technology presented in this disclosure generally relates to radio communication networks, particularly (though not exclusively) radio communication networks using Time Division Duplex (TDD), for example Long-Term Evolution (LTE) TDD. More particularly, the present disclosure relates to methods, user equipment and radio network node for interference mitigation in a dynamic TDD system.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In a TDD system, downlink (DL) and uplink (UL) transmission take place in different, non-overlapping time slots. Typically, a transmitted signal in a radio communication system is organized in some form of frame structure, or frame configuration. For example, LTE generally uses ten equally sized subframes 0-9 of length 1 ms per radio frame. In case of TDD, there is usually a single carrier frequency, and UL and DL transmission are separated in time. Because the same carrier frequency is used for UL and DL transmission, both the BS and the UEs need to switch from transmission to reception and vice versa. An important aspect of a TDD system is to provide a sufficiently large guard time where neither DL nor UL transmission occur in order to avoid interference between UL and DL transmission. For LTE, special subframes (e.g., subframe #1 and, in some cases, subframe #6) provide this guard time. A TDD special subframe is generally split into three parts: a DL part (Downlink Pilot Time Slot, DwPTS), a guard period (GP), and a UL part (Downlink Pilot Time Slot, UpPTS). The remaining subframes are either allocated to UL or DL transmission.

In the current networks, UL/DL configuration is semi-statically configured, thus it may not match the instantaneous traffic situation. This will result in inefficient resource utilization in both UL and DL transmission, especially in cells with a small number of users. In order to provide a more flexible TDD configuration, so-called Dynamic TDD (also sometimes referred to as Flexible TDD) has therefore been introduced. Dynamic TDD configures the TDD UL/DL asymmetry to current traffic situation in order to optimize user experience. For a better understanding of the dynamic TDD subframe configurations, FIG. 1 illustrates an example dynamic TDD subframe configuration.

In the illustrated configuration, dynamic TDD provides an ability of configuring some subframes to be "flexible" subframes, for example, subframes 3, 4, 8, and 9. These flexible subframes can be configured dynamically and flexibly as either for UL transmission or for DL transmission. The subframes being configured as either for UL transmission or DL transmission rely on e.g. the radio traffic situation in a cell. Accordingly, it is expected that dynamic TDD can achieve promising performance improvements in TDD systems when there is a potential load imbalance between UL and DL. Besides, dynamic TDD approach can also be utilized to reduce network energy consumption. It is expected that dynamic UL/DL allocation (hence referred in this section to "dynamic TDD") should provide a good match of allocated resources to instantaneous traffic.

Further, in Layer one (L1) controlled dynamic TDD, whether the flexible subframe is a DL or a UL subframe is decided by the BS or eNB and the UE will follow the UL and DL grant or some indicators from the eNB to judge the subframe is a DL or a UL subframe. If the eNB schedules the UE in the flexible subframe as UL, then the UE will transmit on the subframe as UL. Similarly, if the eNB schedules the UE in the flexible subframe as DL, the UE will receive the DL signal in the flexible subframe. Because the flexible subframes can be configured to be in different transmission directions in different cells, they may not fit in the current interference mitigation mechanism.

Interference mitigation (also sometimes referred to as interference cancelation (IC)) is one of the most promising techniques to enhance the performance of wireless access networks, especially for heterogeneous networks and small cells and has been widely discussed in 3GPP. In LTE Rel-11, cell-specific reference signal (CRS)-IC, primary synchronization signal (PSS)-IC, secondary synchronization signal (SSS)-IC, and Physical Broadcast Channel (PBCH)-IC have been standardized for heterogeneous and homogeneous networks. In LTE Rel-11, in order to enable CRS-IC, PSS/SSS-IC, and PBCH-IC, the eNB needs to provide some assistance information, such as number of CRS ports, cell ID, and Multicast Broadcast Single Frequency Network (MBSFN) configuration, to the UE and the UE may utilize this information to cancel CRS, PSS/SSS and PBCH in a network-assisted manner. To enhance UE performance, Physical Downlink Shared Channel (PDSCH) and Physical Downlink Control Channel (PDCCH)/enhanced Physical Downlink Control Channel (ePDCCH) cancelation are under discussion in LTE Rel-12.

Within current scope of network-assisted ICs such as those discussed above, the same UL-DL configurations are assumed to be applied by both the serving cell and aggressor cells, which may be covered by neighboring eNBs that potentially interfere with the serving eNB. Accordingly, the UE can always assume that the DL interference originates from the DL transmissions of the neighboring eNBs. However, such assumption does not always hold true for the dynamic TDD system in which the flexible subframes can be changeably configured to transmit in a UL or DL direction, bringing about additional interference into the dynamic TDD system.

For example, in the dynamic TDD system, the UE in the reception period and served by the serving eNB is likely to experience interference from DL transmission of the neighboring eNB and interference from UL transmission of the another UE served by the neighboring eNB on the flexible subframes. Similarly, in the dynamic TDD system, the serving eNB in the reception period is also possible to be subject to interference from the UL transmission of another UE served by the neighboring eNB and interference from the DL transmission of the neighboring eNB on the flexible subframes. These kinds of inter-UE and inter eNB-eNB interference occurring in the dynamic TDD system cannot be addressed under the current mechanisms for interference mitigation or IC.

SUMMARY

To address or mitigate at least one of the above potential problems, example embodiments of the present disclosure would provide for an efficient way of mitigating interference in a dynamic TDD system.

According to one aspect of the present disclosure, there is provided a method in a user equipment for interference mitigation in a dynamic time division duplex system, wherein the user equipment, a serving base station serving the user equipment, at least one neighboring base station and at least one neighboring user equipment served by the at least neighboring base station are comprised in the dynamic time division duplex system. The method comprises obtaining link direction information and at least one transmission parameter, wherein the link direction information and the at least one transmission parameter are associated with downlink transmission of the at least one neighboring base station or uplink transmission of the at least one neighboring user equipment. The method also comprises mitigating interference caused by the downlink transmission or uplink transmission based upon the link direction information and the at least one transmission parameter.

According to another aspect of the present disclosure, there is provided a method in a radio network node for interference mitigation in a dynamic time division duplex system, wherein a user equipment, the radio network node serving the user equipment, at least one neighboring base station and at least one neighboring user equipment served by the at least neighboring base station are comprised in the dynamic time division duplex system, The method comprises obtaining link direction information and at least one transmission parameter, wherein the link direction information and the at least one transmission parameter are associated with downlink transmission of the at least one neighboring base station or uplink transmission of the at least one neighboring user equipment. The method also comprises mitigating interference caused by the downlink transmission or uplink transmission based upon the link direction information and the at least one transmission parameter.

According to another aspect of the present disclosure, there is provided a user equipment for interference mitigation in a dynamic time division duplex system, wherein the user equipment, a serving base station serving the user equipment, at least one neighboring base station and at least one neighboring user equipment served by the at least neighboring base station are comprised in the dynamic time division duplex system. The user equipment comprises an obtaining unit configured to obtain link direction information and at least one transmission parameter, wherein the link direction information and the at least one transmission parameter are associated with downlink transmission of the at least one neighboring base station or uplink transmission of the at least one neighboring user equipment. The user equipment also comprises a mitigating unit configured to mitigate interference caused by the downlink transmission or uplink transmission based upon the link direction information and the at least one transmission parameter.

According to another aspect of the present disclosure, there is provided a radio network node for interference mitigation in a dynamic time division duplex system, wherein a user equipment, the radio network node serving the user equipment, at least one neighboring base station and at least one neighboring user equipment served by the at least neighboring base station are comprised in the dynamic time division duplex system. The radio network node comprises an obtaining unit configured to obtain link direction information and at least one transmission parameter, wherein the link direction information and the at least one transmission parameter are associated with downlink transmission of the at least one neighboring base station or uplink transmission of the at least one neighboring user equipment. The radio network node also comprises a mitigating unit configured to mitigate interference caused by the downlink transmission or uplink transmission based upon the link direction information and the at least one transmission parameter. According to the embodiments of the present disclosure, the radio network node may be a base station, e.g., a serving base station or a neighboring base station.

With the aspects of the present disclosure above, together with example embodiments as discussed below, by means of the link direction information, the UE or radio network node would be given the capability of determining the transmission direction of some subframes in a neighboring cell, especially the flexible subframes and carrying out interference mitigation operations corresponding to different link directions based upon the pertinent transmission parameters. For instance, the UE would reconstruct or partially reconstruct, based upon the transmission parameters, the interference signals caused by one or more neighboring BSs or by another aggressor UE, which may be a UE communicating with the neighboring BS or getting involved in D2D (Device-to-Device) communications. Accordingly, it is to be understood that the aspects of the present disclosure and example embodiments can be advantageously applied in the dynamic TDD system to efficiently and effectively overcome or alleviate the interference issues and give quality and efficiency of the wireless communication a big boost.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
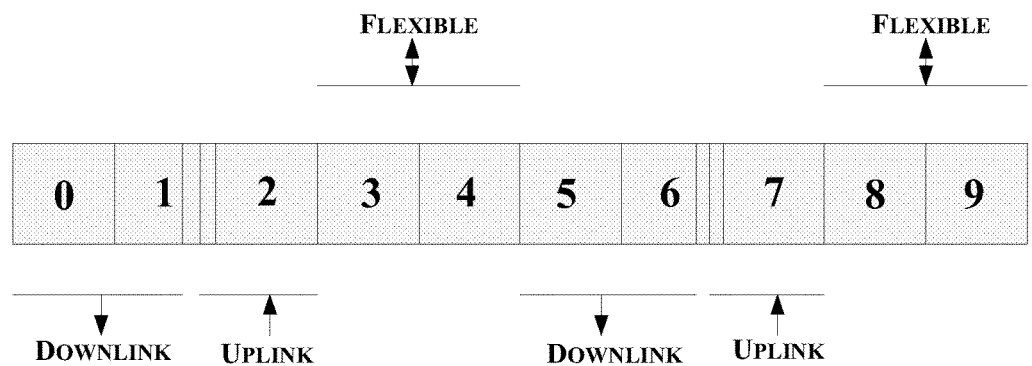
FIG. 1 illustrates dynamic TDD settings in a dynamic TDD system according to exemplary embodiments of the present disclosure.

In the following description, for purposes of explanation and not limitation, specific details are set forth such as particular architectures, interfaces, techniques, etc. However, it will be apparent to those skilled in the art that the technology described here may be practiced in other embodiments that depart from these specific details. That is, those skilled in the art will be able to devise various arrangements which, although not explicitly described or shown herein, embody the principles of the technology described and are included within its scope. In some instances, detailed descriptions of well-known devices, circuits, and methods are omitted so as not to obscure the description with unnecessary detail. All statements herein reciting principles, aspects, and embodiments, as well as specific examples thereof, are intended to encompass both structural and functional equivalents thereof.

Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. Similarly, it will be appreciated that any flow charts and the like represent various processes which may be substantially represented in computer readable medium and so executed by a computer or processor, no matter whether or not such computer or processor is explicitly shown.

The functions of the various elements or units including functional blocks labeled or described as "processor" may be provided through the use of dedicated hardware as well as hardware capable of executing software in the form of coded instructions stored on computer readable medium. When provided by a processor, the functions may be provided by a single dedicated processor, by a single shared processor, or by a plurality of individual processors, some of which may be shared or distributed. Such functions are to be understood as being computer-implemented and thus machine-implemented. Moreover, use of the term "processor" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc, which may or may not have D2D communication enabled. Yet further, the term UE may include Machine Type Communication (MTC) devices, which do not necessarily involve human interaction. Also, the term "radio network node" as used herein generally denotes a fixed point being capable of communicating with the UE and providing wireless access for the UE. As such, it may be changeably referred to as a BS, a radio BS, a NodeB or an evolved NodeB (eNB), access point, relay node, etcetera, with evolution of the wireless communication technique.

Figure 2:
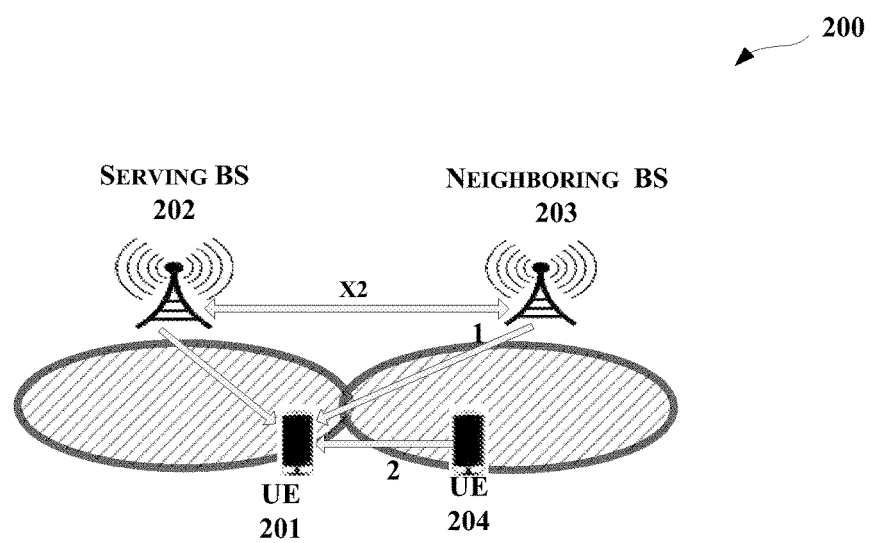
FIG. 2 is an example network architecture under the dynamic TDD system in which exemplary embodiments of the present disclosure can be practiced.

FIG. 2 is an example network architecture 200 under the dynamic TDD system in which exemplary embodiments of the present disclosure can be practiced. As shown in FIG. 2, UE 201 and UE 204, which are depicted as handsets, are respectively in communication with a serving BS 202 and a neighboring BS 203, wherein the serving BS 202 and the neighboring BS 203 may communicate with each other via an X2 interface. It can be understood that there may be a number of UEs within the service coverage of the serving BS 202 and the neighboring BS 203 and that the UE 201 and UE 204 are depicted only for an illustrative purpose. Further, there may be an additional UE that gets involved in the D2D communication and its transmission may also engender interference to the UE 201, which is not discussed further herein for a simplifying purpose. In a communication scenario, when the UE 201 keeps getting close to the coverage of the neighboring BS 203, it is likely to suffer from the interference caused by DL transmission of the neighboring BS 203 as shown by arrow 1 and further suffer from the interference caused by UL transmission of the UE 204 as shown by arrow 2.

As noted before, in a conventional system such as a TDD system, the UE 201 assumes that such interference must be originated from the DL transmission (from the neighboring BS 203 towards the UE 204) of the neighboring BS 203 and thus implements relevant mitigation operations on this interference, such as restoring the interference signals and removing them from the received signals. However, in the dynamic TDD system, the UE 201 may not only confront the interference from the neighboring BS 203 in the DL transmission but also the interference from the UE 204 in the UL transmission, both of which may be unknown to it in advance due to changing characteristic of the flexible subframe. In this case, the UE 201 cannot get correct knowledge of the transmission conditions in the neighboring cell and thus is unlikely to conduct appreciate mitigation operations on this kind of neighboring interference. To this end, the aspects and embodiments of the present disclosure propose methods, a UE and a radio network node, for example, a BS, for interference mitigation in the dynamic TDD, as will be discussed in detail with reference to FIGS. 3-8.

Figure 3:
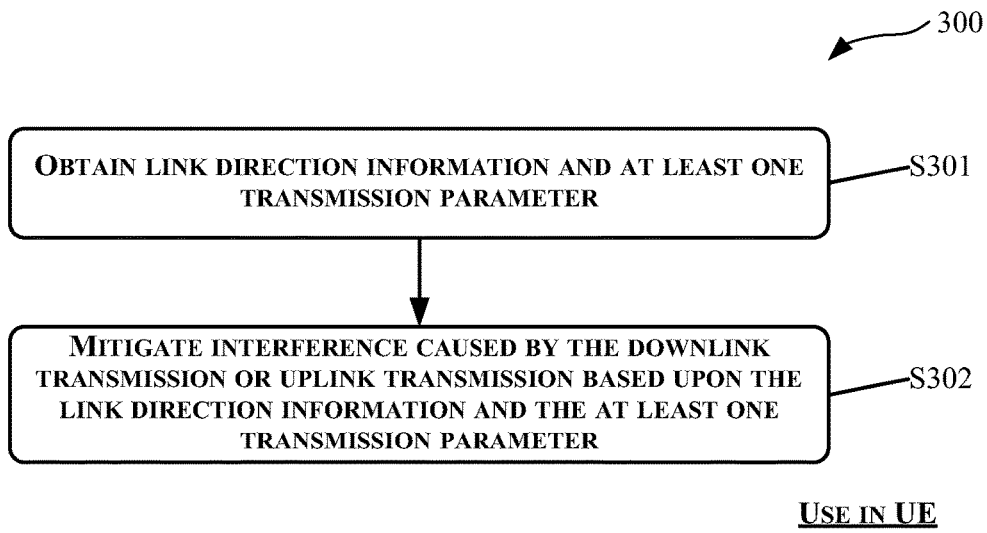
FIG. 3 is a flow chart illustrating a method in a UE for interference mitigation in the dynamic TDD system according to exemplary embodiments of the present disclosure.

FIG. 3 is a flow chart illustrating a method 300 in a UE for interference mitigation in a dynamic TDD system, wherein the UE (such as the UE 201 in FIG. 2), a serving BS (such as the serving BS 202 in FIG. 2) serving the UE, at least one neighboring BS (such as the neighboring BS 203 in FIG. 2) and at least one neighboring UE (such as the neighboring UE 204 in FIG. 2) served by the at least neighboring BS are comprised in the dynamic TDD system, according to exemplary embodiments of the present disclosure. As illustrated in FIG. 3, the method 300, at step S301, obtains link direction information and at least one transmission parameter, wherein the link direction information and the at least one transmission parameter are associated with DL transmission of the at least one neighboring BS or UL transmission of the at least one neighboring UE. Upon obtaining the link direction information and the at least one transmission parameter, the method proceeds to step S302, at which the method 300 mitigates interference caused by the DL transmission or UL transmission based upon the link direction information and the at least one transmission parameter.

Although not illustrated in FIG. 3, in an embodiment, the method 300 further comprises determining whether or not to mitigate the interference based upon at least one of a signaling message, a blind detection and a predetermined rule. In this manner, the interference mitigation in the dynamic TDD system would become more effective since unnecessary mitigation could be avoided. For example, the method 300 may determine, based upon an explicit signaling message from the serving BS or the at least one neighboring BS, whether or not to mitigate interference caused by DL transmission of the at least one neighboring BS or UL transmission of the at least one neighboring UE on the subframe, particularly the flexible subframe. That is to say, whether or not to perform interference mitigation at the UE is dependent on whether an explicit instruction from the serving BS or the neighboring BS is correctly received. In this manner, the interference mitigation at the UE becomes even more straightforward and efficient.

In an embodiment, the at least one transmission parameter, possibly together with the link direction information, is obtained indirectly from the at least one neighboring BS via the serving BS or obtained directly from the at least one neighboring BS. In other words, the neighboring BS can send the link direction information and transmission parameter directly to the UE via e.g., a signaling message (explicit or implicit), or the neighboring BS can send the both to the serving BS via the X2 interface and in turn, the serving BS sends this link direction information and the transmission parameter to the UE. In the present disclosure, the link direction information may be included in a signaling message as certain fields which indicate the transmission directions of relevant subframes including the flexible subframes by one or more bits.

In another embodiment, the link direction information is obtained based upon a blind detection performed by the UE itself based upon some reference signals, such as CRS or a channel state information-reference signal (CSI-RS) or other pre-known physical channels, while optionally at least one transmission parameter is obtained from the serving BS, such as a threshold value to determine the CRS or CSI-RS transmission from a neighboring cell on a flexible subframe.

In an embodiment, the at least one transmission parameter is associated with the UL transmission of the at least one neighboring UE and the method 300 further comprises mitigating the interference on a subframe based upon the at least one UL transmission parameter when the link direction information indicates the subframe being used for UL transmission of the at least one neighboring UE and the interference is present in the subframe.

In an embodiment, the at least one transmission parameter associated with the UL transmission of the at least one neighboring UE may include a transmission mode, a physical uplink share channel (PUSCH) configuration, a physical uplink control channel (PUCCH) configuration, a sounding reference signal (SRS) configuration, and a DMRS configuration, as non-limiting examples.

In another embodiment, the at least one transmission parameter is associated with the DL transmission of the at least one neighboring BS and the method 300 further comprises mitigating the interference on a subframe based upon the at least one DL transmission parameter when the link direction information indicates the subframe being used for DL transmission of the at least one neighboring BS and the interference is present in the subframe.

In an embodiment, the at least one transmission parameter associated with DL transmission of the at least one neighboring BS may include at least one of a transmission mode, a CRS power configuration, a CSI-RS configuration, a modulation and coding scheme (MCS), a PDSCH configuration, a PDCCH configuration, a physical control format indicator channel (PCFICH) configuration, an ePDCCH configuration, a physical hybrid automatic repeat request indicator (PHICH) configuration, and a data demodulation reference signal (DMRS) configuration, a preset threshold value to determine the transmission of certain physical channel in a neighboring cell, as non-limiting examples.

In a further embodiment, the DL interference is originated from relatively static signal transmission of the neighboring BS and the method 300 further comprises mitigating the relatively static signal. The relatively static signal, which may also be referred to as "regular" interference signal, is a signal that has a characteristic of remaining unchanged or occurring in a periodic time interval, such as CRS, PSS/SSS, and PBCH, which occur or are triggered on a regular basis, as non-limiting examples. For instance, if the DL transmission is CRS transmission of the at least one neighboring BS and the method 300 may further comprise mitigating the CRS transmission from the neighboring BS since the CRS causes potentially relatively static interference on the normal transmission of the UE (such as the UE 201) and should be mitigated, which will be detailed with reference to FIG. 6 as an example scenario.

In another embodiment, the method 300 may further comprise determining the presence of the interference. For example, when the link direction information indicates that the flexible subframe is used for DL transmission of the neighboring BS and the UE detects that CRS is carried by this flexible subframe according to a CRS power configuration as one transmission parameter, then the UE may restore this CRS and remove it from the received signals. Thereby, CRS mitigation would be successfully implemented.

In the embodiments as discussed above, the subframe could be a subframe whose transmission direction is not fixed and could be changed according to traffic variations, such as the flexible subframe.

With the method 300 and its variety of extensions as discussed in the embodiments above, the interference caused by the neighboring cell in the dynamic TDD system can be effectively and efficiently mitigated and even eliminated as needed. Further, it is known to those skilled in the art how the UE utilizes the transmission parameters to reconstruct or partially reconstruct the interference signals according to accuracy requirements and thus further details in this regard are omitted herein so as not to unnecessarily obscure the embodiments of the present disclosure.

Figure 4:
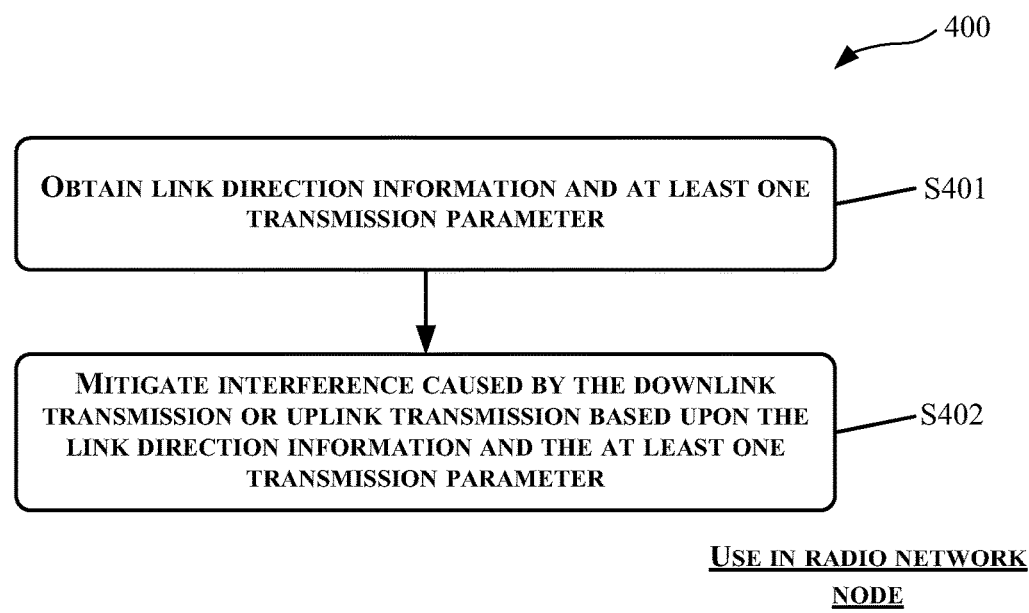
FIG. 4 is a flow chart illustrating another method in a radio network node for interference mitigation in the dynamic TDD system according to exemplary embodiments of the present disclosure.

FIG. 4 is a flow chart illustrating a method 400 in a radio network node for interference mitigation in a dynamic TDD system, wherein a UE (such as the UE 201 in FIG. 2), the radio network node (such as the serving BS 202 in FIG. 2) serving the UE, at least one neighboring BS (such as the neighboring BS 203 in FIG. 2) and at least one neighboring UE (such as the neighboring UE 204 in FIG. 2) served by the at least neighboring BS are comprised in the dynamic TDD system, according to exemplary embodiments of the present disclosure. As illustrated in FIG. 4, the method 400, at step S401, obtains link direction information and at least one transmission parameter, wherein the link direction information and the at least one transmission parameter are associated with DL transmission of the at least one neighboring BS or UL transmission of the at least one neighboring UE. Upon obtaining the link direction information and the at least one transmission parameter, the method proceeds to step S402, at which the method 400 mitigates interference caused by the DL transmission or UL transmission based upon the link direction information and the at least one transmission parameter.

Although not illustrated in FIG. 4, in an embodiment, the method 400 further comprises determining whether or not to mitigate the interference based upon at least one of a signaling message, a blind detection and a predetermined rule. In this manner, the interference mitigation at the radio network node would become more effective since unnecessary mitigation could be avoided. In another embodiment, the radio network node could receive the transmission parameter from the neighboring BS via the X2 interface. Regarding the link direction information, the radio network node may obtain it by itself through the blind detection, as the UE does when the method 300 is carried out in the UE.

It should be noted that the method 400 as performed in the radio network node is similar to the method 300 as discussed with reference to FIG. 3 and therefore the extensions of the method 300 as discussed in the embodiments before could be applied mutatis mutandis in the radio network node.

To further facilitate a better understanding of the present disclosure, the following will discuss the interference mitigation in the dynamic TDD system from a neighboring BS perspective, wherein the dynamic TDD system has the same architecture as shown in FIG. 2.

At the beginning, the neighboring BS may obtain at least one transmission parameter associated with DL transmission thereof or UL transmission of the at least one neighboring UE as served by the neighboring BS. Since the link direction information can be determined by the UE or the serving BS itself based upon the blind detection, the neighboring BS may need not to obtain such information. Then, the neighboring BS transmits the at least one transmission parameter to the UE or the serving BS for mitigating the interference caused by corresponding UL or DL transmission in the neighboring cell. For example, as previously discussed, the UE or the serving BS, such as the UE 201 or the serving BS 202 in FIG. 2, may mitigate the interference based upon the link direction information and the received at least one transmission parameter.

As an alternative, the link direction information could also be obtained at the at least one neighboring BS and the method 400 further comprises transmitting, directly or indirectly via a serving BS, the at least one transmission parameter and the link direction information to the UE for interference mitigation. Similar to the discussion with respect to the method 300, the neighboring BS can send the link direction information together with the transmission parameter directly to the UE via an explicit or implicit signaling message. Alternative thereto, through the X2 as depicted in FIG. 2, the neighboring BS could first send the transmission parameter and the link direction information to the serving BS via which the this parameter and information could be got by the UE. As noted before, since the UE can perform the blind detection, link direction information, such as those with respect to CRS or CSI-RS, can be obtained on its own without assistance from the neighboring eNB.

It should be noted that the details regarding the link direction information and transmission parameters as discussed with respect to the methods 300 and 400 can be equally applied herein and thus the same or similar descriptions are omitted herein for a simplicity purpose.

Figure 5:
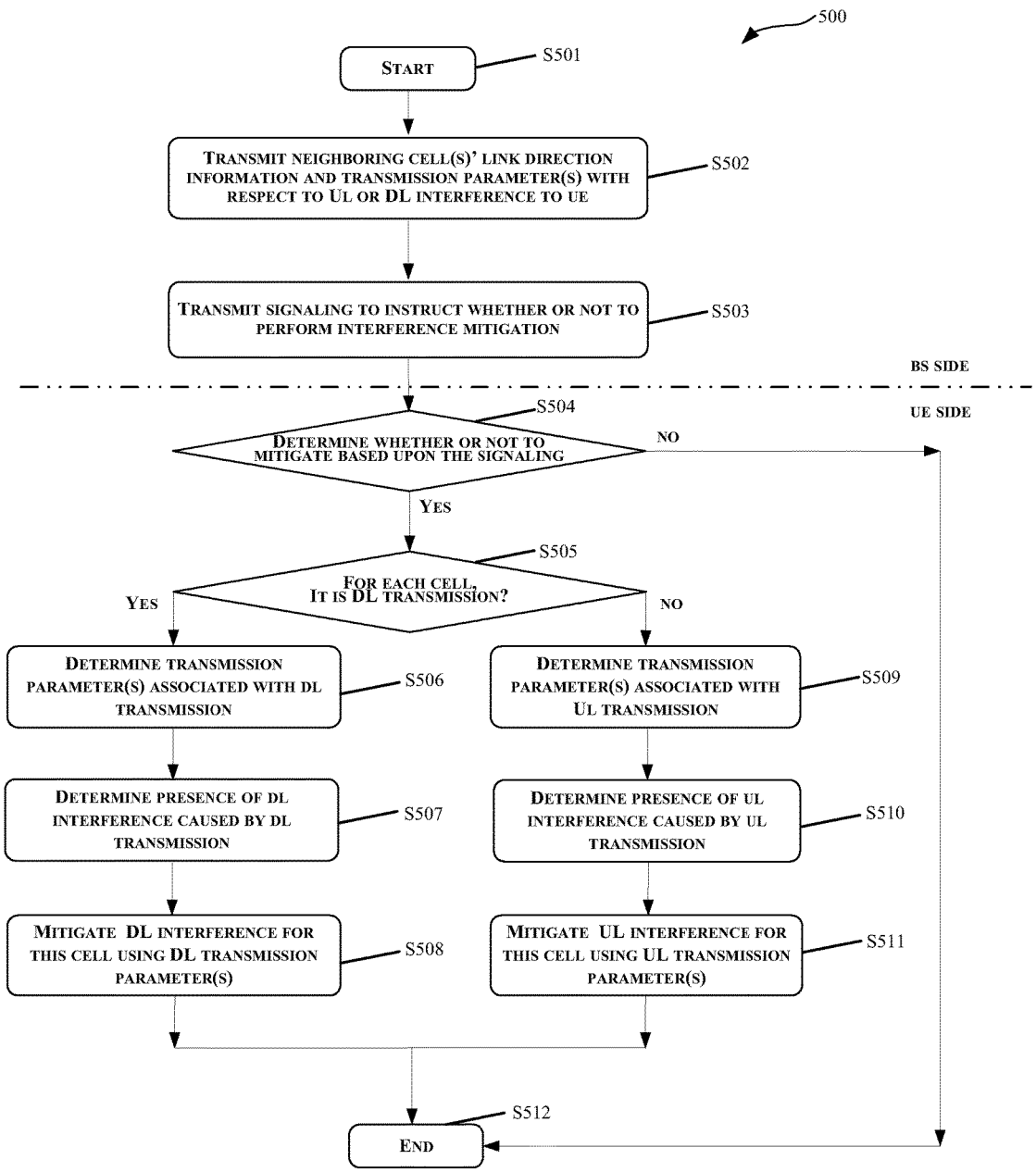
FIG. 5 is a flow chart illustrating in detail a method for interference mitigation in the dynamic TDD system according to exemplary embodiments of the present disclosure.

FIG. 5 is a flow chart illustrating in detail a method 500 for interference mitigation in the dynamic TDD system according to exemplary embodiments of the present disclosure. As illustrated in FIG. 5, the method 500 starts at step S501 and at step S502, the method 500 transmits the link direction information and at least one transmission parameter with respect to the interference due to the UL or DL transmission in the neighboring cell to the UE. At discussed before, this transmitting can be done by a serving BS or by a neighboring BS via the serving BS through e.g., an explicit signaling message. Alternatively, only transmission parameter is transmitted to the UE and the link direction information can be obtained or derived on UE's own. The link direction information and the transmission parameter can be indicated or represented by one or more bits in certain fields of signaling messages and can be exchanged between the BSs in advance such that the interference mitigation can be got well prepared. It is to be understood that there could be correspondence between the link direction information and the transmission parameters such that the transmission parameters are associated with the UL transmission if the link direction information indicates the UL transmission on the flexible subframes and the transmission parameters are associated with the DL transmission if the link direction information indicates the DL transmission on the flexible subframes.

At step S503, the method 500 transmits the signaling to the UE to instruct whether or not to perform the interference mitigation. For example, the serving BS can send an explicit message to the UE to instruct it not to perform the interference mitigation with respect to the CRS during the process of the UL transmission of the neighboring BS. Also, the neighboring BS may send an explicit message to the UE to instruct it to perform the interference mitigation with respect to the CRS during the process of the DL transmission of the neighboring BS.

Upon completion of the processing at steps S502 and S503 at the BS side, such as the neighboring BS or the serving BS side, the flow of the method 500 proceeds to the processing that is performed at the UE side. As mentioned before, the processing performed at the UE side could also be carried out at the serving BS in a substantively identical manner. At step S504, the method 500 determines whether or not to perform the interference mitigation based upon the signaling message. In addition to the signaling message, whether or not to perform the interference mitigation could also be dependent upon one or more predetermined rule or a result of the blind detection.

If it is determined that no interference mitigation is performed, then the flow will switch to step S512 where the method 500 ends at least for the interference mitigation of the neighboring cell. Otherwise, the method 500 proceeds to step S505, at which the UE may determine whether it is DL transmission for the neighboring cell based upon the link direction information. If the result of the determination is "YES," then the flow would switch to step S506, at which the UE may determine or extract the transmission parameters associated with the DL transmission of the neighboring BS from e.g., a signaling message. The transmission parameters herein may include but are not limited to one or more parameters associated with configurations of the following: CRS, DMRS, CSI-RS, PDSCH, PDCCCH/PCFICH, ePDCCH, PHICH, etc.

Subsequent to determining the transmission parameters, the method 500 advances to step S507, at which the UE may determine the presence or existence of the interference caused by the DL transmission of the neighboring BS. As discussed before, the UE can determine the presence of interference based on the interference power. If the interference power exceeds a predefined threshold value, the UE can assume the interference is present. In another example, the UE can determine the presence of the interference based on the difference of the received power of reference signal and data/control signals from the neighboring cells (or referred to as aggressor cells). If the difference of the received power of reference signal and data/control signal from the aggressor cells is greater than a predefined threshold value, the UE can assume there is no data/control interference from the neighboring cells. Additionally, in another example, for the static interference, such as caused by the CRS or CSI-RS, the UE can determine the presence of interference based on the correlation of detected signal and the target CRS or CSI-RS sequence. If the correlation result is greater than a predefined or configured threshold value, the UE can assume these interference signals are transmitted; otherwise, the UE will deem these signals absent.

Upon determination of the presence of the interference, the method 500 proceeds to step S508, at which the UE may mitigate the DL interference for the neighboring cell using the transmission parameter. For example, the UE would apply these transmission parameters to reconstruct or partially reconstruct the DL signal of the neighboring cell according to DL protocol and then cancel or remove this DL signal from the received signal. In this manner, the interference from the DL transmission of the neighboring BS can be mitigated. Then, the method 500 ends at step S512.

If it is determined at step S505 that UL transmission is taking place in the neighboring cell, then the UE at step S509, may determine the transmission parameter associated with the UL transmission. The transmission parameters herein may include but are not limited to one or more parameters associated with configurations of the following: PUSCH, PUCCH, SRS and/or DMRS, etc. At step S510, the UE may determine the presence of the UL interference caused by the UL transmission of the neighboring cell, e.g., the UL transmission of the UE 2 as shown in FIG. 2, in a manner similar to the one as discussed with respect to the DL transmission above. After determining the presence of the interference, at step S511, the UE may mitigate the UL interference from the neighboring cell using the UL transmission parameters. Then, the method 500 ends at step S512. The interference mitigation for one neighboring BS is completed so far and would be repeated again for a next neighboring BS when there are multiple neighboring BSs in proximity of the serving BS.

The foregoing has discussed in detail the interference mitigation in the dynamic TDD according to embodiments of the present disclosure. Among the steps shown in FIG. 5, steps S502, S503, S504, S506, S507, S509, and S510 are optional, changeable, or even preferred steps and they are only for illustrative purposes. For example, in a simplified form, steps S503 and S504 could be omitted since the interference mitigation could be enabled as long as the transmission parameter and link direction information are available. Again, through predetermined agreements or configurations, determination of the transmission parameter or presence of the interference would also become unnecessary. Further, steps S509-511 could all be skipped. In other words, as a predetermined rule, once it is determined that UL transmission arises in the neighboring cell, the interference mitigation can be disabled. Similarly, the interference mitigation could also be disabled if the DL transmission is ongoing in the neighboring cell, as another predetermined rule. Therefore, it can be seen that the methods according to the embodiments of the present disclosure can be flexibly implemented and thus the scope thereof should not be limited to these detailed implementational forms.

Figure 6:
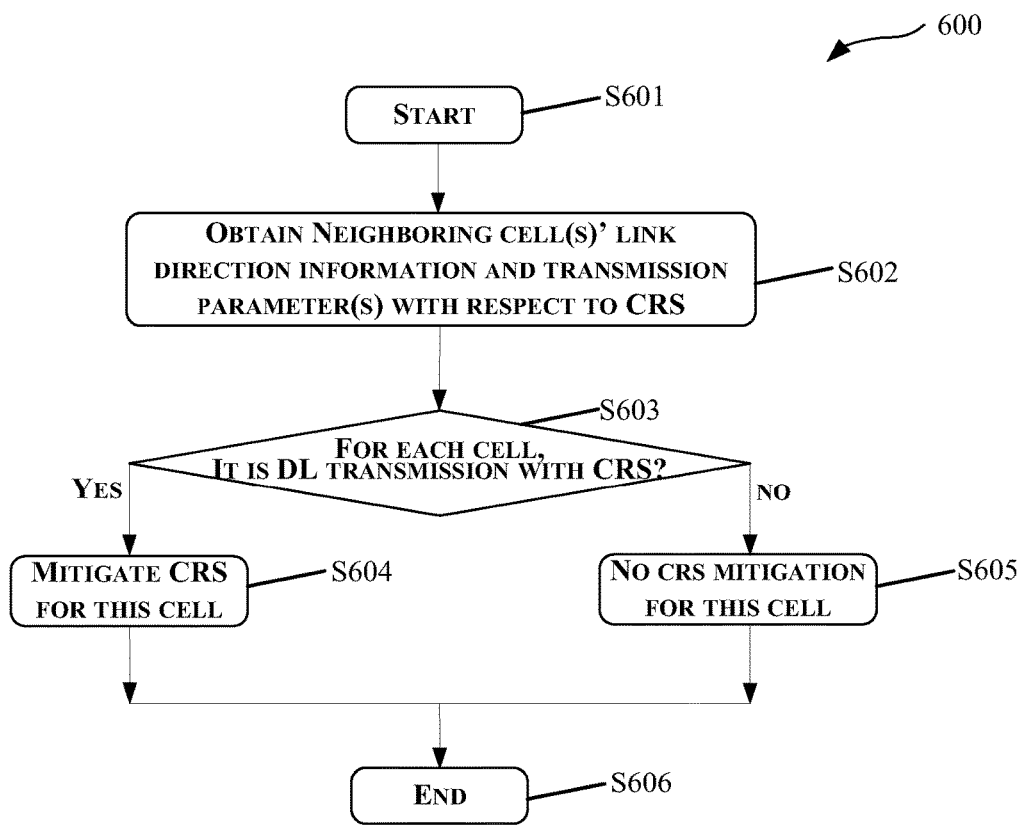
FIG. 6 is a flow chart illustrating another method in a UE for mitigation of CRS in the dynamic TDD system according to exemplary embodiments of the present disclosure.

For a better understanding of the present disclosure, the following will discuss a typical relatively static interference scenario, i.e., CRS, with reference to FIG. 6, which is a flow chart illustrating another method 600 in a UE for mitigation of CRS in the dynamic TDD system according to exemplary embodiments of the present disclosure. The method 600 begins at step S601 and proceeds to step S602, at which the UE may obtain the link direction information and the at least one transmission parameter with respect to the DL CRS. As discussed before with regards to the methods 300-500, the link direction information may be obtained directly from the neighboring BS or indirectly via a serving BS through a signaling message (explicit or implicit). At step S603, the UE may determine, based upon the link direction information, whether the transmission direction of the neighboring BS is in a DL direction. For example, the UE may determine that the flexible subframe is used for DL transmission in a neighboring cell and thus there exists potential interference from the neighboring BS. Further, the UE may also determine whether the CRS arises in the flexible at issue based upon e.g., a CRS power configuration as a transmission parameter transmitted from the neighboring BS.

If the result of the determination at step S603 is "YES," then the flow switches to step S604, at which the UE can mitigate CRS from this neighboring cell based upon the transmission parameter. Otherwise, the flow switches to step S605, at which the UE would not perform the CRS mitigation for the neighboring cell. After that, the method ends at step S606.

Although not shown in FIG. 6, in an embodiment, the method 600 may further comprise determining whether to perform the CRS mitigation according to a signaling message, a blind detection or a predetermined rule. For example, regarding the signaling message, the serving BS or neighboring BS may instruct the UE to or not to perform the CRS mitigation using one or more bits in certain fields of the explicit signaling message. Regarding the blind detection, the UE may blindly determine whether the CRS exists in the DL transmission and thus decide to perform the CRS mitigation once the presence of the CRS is positive. Regarding the predetermined rule, it can be set in advance in the way that if the DL subframe of the neighboring BS is flexible subframe, the UE disables the CRS mitigation during the signal processing of the said subframe regardless of whether the flexible subframe is configured for DL or UL transmission by the neighboring BS. It should be noted that the predetermined rule herein is only for illustrative purposes and any suitable rules can be devised and applied by those skilled in the art having the benefits of the teaching by the present disclosure.

As an alternative to the foregoing embodiments, in the flexible subframe, the UE may proactively detect and decide whether the neighbor cell is configured to DL transmission or UL transmission. If the DL is configured with a new carrier type, the UE may further detect whether the corresponding DL subframe contains the CRS or not. The detection can be based on the neighboring cell reference signal (CRS, DMRS or CSI-RS). As another alternative, the UE may also monitor the explicit signaling which is used to reconfigure the TDD UL/DL configuration of flexible subframes in a neighboring cell. In either case, once the UE determines that the neighbor cell uses DL with CRS, the UE cancels the neighbor cell's CRS interference; otherwise, no CRS inference mitigated is activated.

It should be noted that one or more of the steps of the methods 300-600 described herein and other steps described herein may be implemented as computer code stored on a computer readable storage medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

Figure 7:
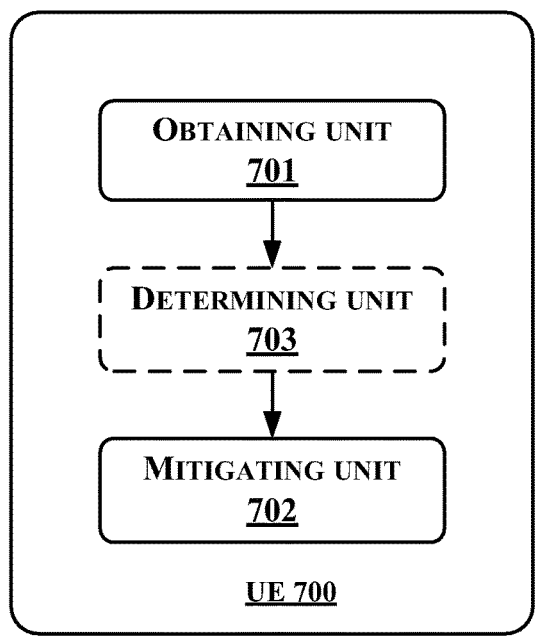
FIG. 7 is a schematic block diagram of a UE according to exemplary embodiments of the present disclosure.

FIG. 7 is a schematic block diagram of a UE 700 according to exemplary embodiments of the present disclosure. As illustrated in FIG. 7, the UE 700 comprises an obtaining unit 701 configured to obtain link direction information and at least one transmission parameter, wherein the link direction information and the at least one transmission parameter are associated with DL transmission of the at least one neighboring BS or UL transmission of the at least one neighboring UE. The UE 700 also comprises a mitigating unit 702 configured to mitigate interference caused by the downlink transmission or uplink transmission based upon the link direction information and the at least one transmission parameter. In some embodiments, the UE 700 may further comprise a determining unit 703 configured to determine whether or not to mitigate the interference based upon at least one of a signaling message, a blind detection and a predetermined rule.

It is to be understood that the UE 700 may implement steps of the methods 300, 500, and 600 as discussed with reference to FIGS. 3, 5, and 6. Due to different implementations, the obtaining unit 701, the mitigating unit 702 and the determining unit 703 can be implemented in hardware and/or software. For example, the UE 700 may comprise for instance a processor executing software program code for realizing the required functions. Alternatively, it could be for instance a circuit that is designed to realize the above-discussed methods and required functions, for instance implemented in a chipset or a chip, like an integrated circuit.

Figure 8:
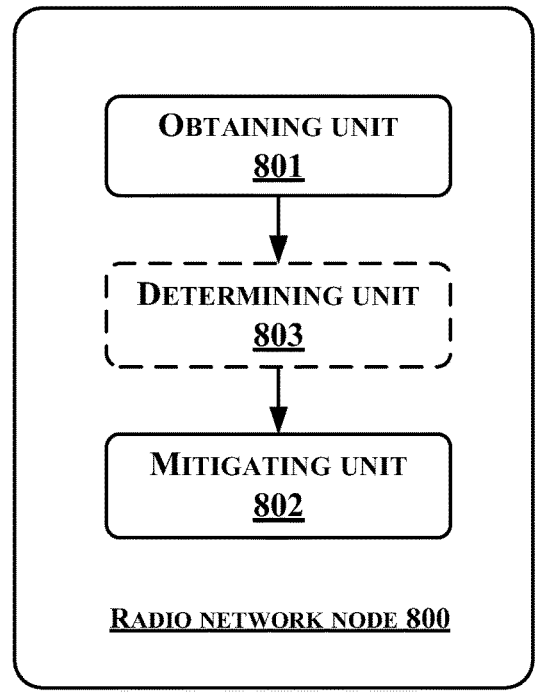
FIG. 8 is a schematic block diagram of a radio network node according to exemplary embodiments of the present disclosure.

FIG. 8 is a schematic block diagram of a radio network node 800 according to exemplary embodiments of the present disclosure. As illustrated in FIG. 8, the radio network node 800 comprises an obtaining unit 801 configured to obtain link direction information and at least one transmission parameter, wherein the link direction information and the at least one transmission parameter are associated with DL transmission of the at least one neighboring BS or UL transmission of the at least one neighboring UE. The radio network node 800 further comprises a mitigating unit 802 configured to mitigate interference caused by the DL transmission or UL transmission based upon the link direction information and the at least one transmission parameter. In some embodiments, the radio network node 800 may further comprise a determining unit 803 configured to determine whether or not to mitigate the interference based upon at least one of a signaling message, a blind detection and a predetermined rule. Although not shown, in some embodiments, if the radio network node 800 decides by itself or is configured not to perform the interference mitigation some time, it may further comprise an instructing unit configured to instructing, via a signaling message, the UE to (or not to) mitigate the interference from the neighboring cell.

It is to be understood that the radio network node 800 may implement the steps as recited in the method 400. Due to different implementations, the obtaining unit 801, the transmitting unit 802 and the determining unit 803 as included in the radio network node 800 can be implemented in hardware and/or software. For example, the radio network node 800 may comprise for instance a processor executing software program code for realizing the required functions. Alternatively, it could be for instance a circuit that is designed to realize the above-discussed method and required functions, for instance implemented in a chipset or a chip, like an integrated circuit. As previously discussed, the radio network node 800 can be embodied as a BS, an eNB or the like, and more particularly, a serving BS or a neighboring BS who acts as an aggressor in the interference mitigation. Of course, since a BS may act as an aggressor or sufferer in the neighboring-type interference as discussed in the present disclosure, the BS according to the present disclosure may be given capability of performing the methods 300-600 regardless of which actor the BS plays in the interference.

Although the present technology has been described above with reference to specific embodiments, it is not intended to be limited to the specific form set forth herein. For example, the embodiments presented herein are not limited to the existing TDD configuration; rather they are equally applicable to new TDD configurations defined in future. The technology is limited only by the accompanying claims and other embodiments than the specific above are equally possible within the scope of the appended claims. As used herein, the terms "comprise/comprises" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method in a user equipment for interference mitigation in a dynamic time division duplex system, wherein the user equipment, a serving base station serving the user equipment, at least one neighboring base station and at least one neighboring user equipment served by the at least neighboring base station are comprised in the dynamic time division duplex system, the method comprising:
   obtaining link direction information and at least one transmission parameter, wherein the link direction information and the at least one transmission parameter are associated with downlink transmission of the at least one neighboring base station or uplink transmission of the at least one neighboring user equipment;
   determining whether or not to mitigate the interference is based on a predetermined rule,
      wherein the predetermined rule provides that a subframe of the neighboring base station is a flexible subframe and the user equipment disables the mitigation operation during processing of the flexible subframe, regardless of whether the flexible subframe is configured for the downlink transmission or uplink transmission by the neighboring base station; and
   if it is determined to mitigate the interference, mitigating interference caused by the downlink transmission or uplink transmission based upon the link direction information and the at least one transmission parameter,
   wherein:
      the at least one transmission parameter is associated with the uplink transmission of the at least one neighboring user equipment; and mitigating the interference on the subframe based upon the at least one uplink transmission parameter when the link direction information indicates the subframe being used for uplink transmission of the at least one neighboring user equipment and the interference is present in the subframe.

2. The method according to claim 1, further comprising: determining whether or not to mitigate the interference based upon at least one of a signaling message and a blind detection.

3. The method according to claim 1, wherein the at least one transmission parameter is obtained indirectly from the at least one neighboring base station via the serving base station or obtained directly from the at least one neighboring base station.

4. The method according to claim 1, wherein the at least one transmission parameter is associated with the downlink transmission of the at least one neighboring base station and the method further comprises:
   mitigating the interference on the subframe based upon the at least one downlink transmission parameter when the link direction information indicates the subframe being used for downlink transmission of the at least one neighboring base station and the interference is present in the subframe.

5. The method according to claim 4 wherein the interference is from relatively static signal transmission of the at least one neighboring base station and the method further comprises mitigating the relatively static signal.

6. The method according to claim 1, wherein the transmission parameter associated with the uplink transmission of the at least one neighboring user equipment comprises at least one of a transmission mode, a sounding reference signal (SRS) configuration and a data demodulation reference signal (DMRS) configuration.

7. A user equipment for interference mitigation in a dynamic time division duplex system, wherein the user equipment, a serving base station serving the user equipment, at least one neighboring base station and at least one neighboring user equipment served by the at least neighboring base station are comprised in the dynamic time division duplex system, the user equipment comprising one or more processors configured to:
   obtain link direction information and at least one transmission parameter, wherein the link direction information and the at least one transmission parameter are associated with downlink transmission of the at least one neighboring base station or uplink transmission of the at least one neighboring user equipment;
   determine whether or not to mitigate the interference is based on a predetermined rule,
      wherein the predetermined rule provides a that a sub frame of the neighboring base station is a flexible subframe and user equipment disables the mitigation operation during processing of the flexible sub frame, regardless of whether the flexible subframe is configured for the downlink transmission or uplink transmission by the neighboring base station; and
   if it is determined to mitigate the interference, mitigate interference caused by the downlink transmission or uplink transmission based upon the link direction information and the at least one transmission parameter,
   wherein:
      the at least one transmission parameter is associated with the uplink transmission of the at least one neighboring user equipment; and
      mitigate the interference on the subframe based upon the at least one uplink transmission parameter when the link direction information indicates the subframe being used for uplink transmission of the at least one neighboring user equipment and the interference is present in the subframe.

8. The user equipment according to claim 7, wherein the one or more processors are further configured to:
   determine whether or not to mitigate the interference based upon at least one of a signaling message and a blind detection.

9. The user equipment according to claim 7, wherein the at least one transmission parameter is obtained indirectly from the at least one neighboring base station via the serving base station or obtained directly from the at least one neighboring base station.

10. The user equipment according to claim 7, wherein the at least one transmission parameter is associated with the downlink transmission of the at least one neighboring base station and the one or more processors are further configured to mitigate the interference on the subframe based upon the at least one downlink transmission parameter when the link direction information indicates the subframe being used for downlink transmission of the at least one neighboring base station and the downlink interference is present in the subframe.

11. The user equipment according to claim 10, wherein the interference is from relatively static signal transmission of the at least one neighboring base station and the one or more processors are further configured to mitigate the relatively static signal.

12. The method according to claim 7, wherein the transmission parameter associated with the uplink transmission of the at least one neighboring user equipment comprises at least one of a transmission mode, a sounding reference signal (SRS) configuration and a data demodulation reference signal (DMRS) configuration.

13. A method in a radio network node for interference mitigation in a dynamic time division duplex system, wherein a user equipment, the radio network node serving the user equipment, at least one neighboring base station and at least one neighboring user equipment served by the at least neighboring base station are comprised in the dynamic time division duplex system, the method comprising:
   obtaining link direction information and at least one transmission parameter, wherein the link direction information and the at least one transmission parameter are associated with downlink transmission of the at least one neighboring base station or uplink transmission of the at least one neighboring user equipment;
   determining whether or not to mitigate the interference is based on a predetermined rule,
      wherein the predetermined rule provides that a subframe of the neighboring base station is a flexible subframe and the user equipment disables the mitigation operation during processing of the flexible subframe, regardless of whether the flexible subframe is configured for the downlink transmission or uplink transmission by the neighboring base station; and
   if it is determined to mitigate the interference, mitigating interference caused by the downlink transmission or uplink transmission based upon the link direction information and the at least one transmission parameter, wherein:
the at least one transmission parameter is associated with the downlink transmission of the at least one neighboring base station; and
mitigating the interference on the subframe based upon the at least one downlink transmission parameter when the link direction information indicates the subframe being used for downlink transmission of the at least one neighboring base station and the interference is present in the subframe.

14. The method according to claim 13, further comprising: determining whether or not to mitigate the interference based upon at least one of a signaling message and a blind detection.

15. The method according to claim 13, wherein the at least one transmission parameter is obtained from the at least one neighboring base station and the link direction information is obtained at the radio network node.

16. The method according to claim 13 wherein the at least one transmission parameter is associated with the uplink transmission of the at least one neighboring user equipment and the method further comprises:
mitigating the interference on the subframe based upon the at least one uplink transmission parameter when the link direction information indicates the sub frame being used for uplink transmission of the at least one neighboring user equipment and the interference is present in the subframe.

17. The method according to claim 13, wherein the interference is from relatively static signal transmission of the at least one neighboring base station and the method further comprises mitigating the relatively static signal.

18. The method according to claim 13, wherein the transmission parameter associated with the uplink transmission of the at least one neighboring user equipment comprises at least one of a transmission mode, a sounding reference signal (SRS) configuration and a data demodulation reference signal (DMRS) configuration.

19. A radio network node for interference mitigation in a dynamic time division duplex system, wherein a user equipment, the radio network node serving the user equipment, at least one neighboring base station and at least one neighboring user equipment served by the at least neighboring base station are comprised in the dynamic time division duplex system, the radio network node comprising one or more processors configured to:
obtain link direction information and at least one transmission parameter, wherein the link direction information and the at least one transmission parameter are associated with downlink transmission of the at least one neighboring base station or uplink transmission of the at least one neighboring user equipment;
determine whether or not to mitigate the interference is based on a predetermined rule,
wherein the predetermined rule provides that a subframe of the neighboring base station is a flexible subframe and the user equipment disables the mitigation operation during processing of the flexible subframe, regardless of whether the flexible subframe is configured for the downlink transmission or uplink transmission by the neighboring base station; and
if it is determined to mitigate the interference, mitigate interference caused by the downlink transmission or uplink transmission based upon the link direction information and the at least one transmission parameter;
wherein:
the at least one transmission parameter is associated with the downlink transmission of the at least one neighboring base station; and
mitigating the interference on the subframe based upon the at least one downlink transmission parameter when the link direction information indicates the subframe being used for downlink transmission of the at least one neighboring base station and the interference is present in the subframe.

20. The radio network node according to claim 19, wherein the one or more processors are further configured to:
determine whether or not to mitigate the interference based upon at least one of a signaling message and a blind detection.

21. The radio network node according to claim 19, wherein the at least one transmission parameter is obtained from the at least one neighboring base station.

22. The radio network node according to claim 19 wherein the at least one transmission parameter is associated with the uplink transmission of the at least one neighboring user equipment and the one or more processors are further configured to mitigate the interference on the subframe based upon the at least one uplink transmission parameter when the link direction information indicates the subframe being used for uplink transmission of the at least one neighboring user equipment and the interference is present in the subframe.

23. The radio network node according to claim 19, wherein the interference is from relatively static signal transmission of the at least one neighboring base station and the one or more processors are further configured to mitigate the relatively static signal.

24. The radio network node according to claim 19, wherein the transmission parameter associated with the uplink transmission of the at least one neighboring user equipment comprises at least one of a transmission mode, a sounding reference signal (SRS) configuration and a data demodulation reference signal (DMRS) configuration.

* * * * *